US005082233A

United States Patent [19]

Ayers et al.

[11] Patent Number: 5,082,233

[45] Date of Patent: Jan. 21, 1992

[54] EQUIPMENT HOLD-DOWN APPARATUS

[76] Inventors: Gary M. Ayers, 13054 Bradwell Ave., Sylmar, Calif. 91342; Paul A. Thomas, 408 Meyer St., San Fernando, Calif. 91340

[21] Appl. No.: 515,635

[22] Filed: Apr. 27, 1990

[51] Int. Cl.[5] .......... F16M 13/00

[52] U.S. Cl. .......... 248/553; 248/681; 248/205.3

[58] Field of Search .......... 248/551-553, 248/681, 205.3

[56] References Cited

U.S. PATENT DOCUMENTS 4,691,891 9/1987 Dionne .......... 248/551

4,739,637 4/1988 Finkel et al. .......... 248/553 X

*Primary Examiner*—Alvin C. Chin-Shue

*Attorney, Agent, or Firm*—Roger A. Marrs

[57] ABSTRACT

A hold-down device for office equipment or the like is disclosed herein having an elongated base with a lock retainer at one end and a hook retainer at its opposite end for releasably engaging with the opposite ends of a support member to which equipment is carried. The support member is adhesively attached to the underside of the equipment and the lock retainer includes a rotating latch carried on the support member engageable with an undercut provided on a raised portion carried on the base. A shoulder provided on a lock retainer mounting element guides and locates the placement of the equipment onto the support member.

1 Claim, 1 Drawing Sheet

FIG. 1.
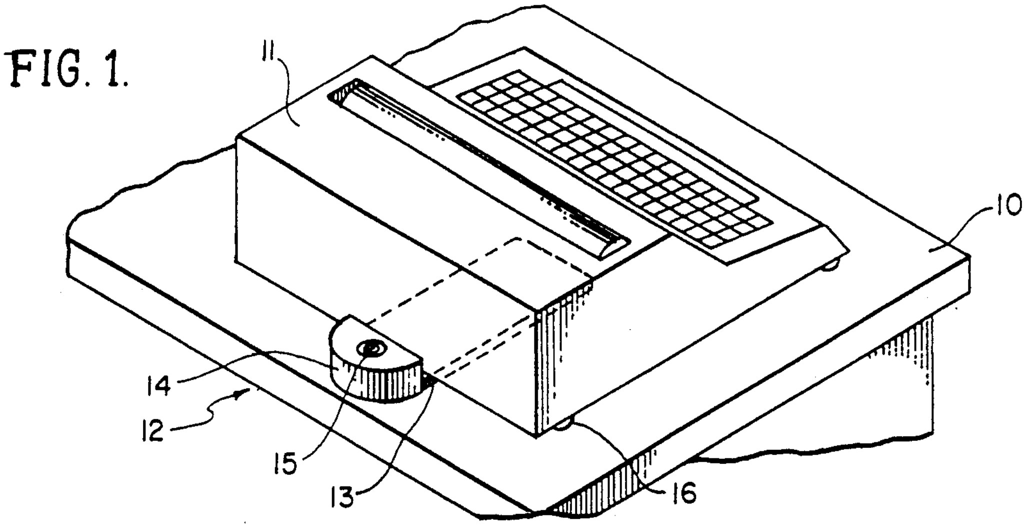
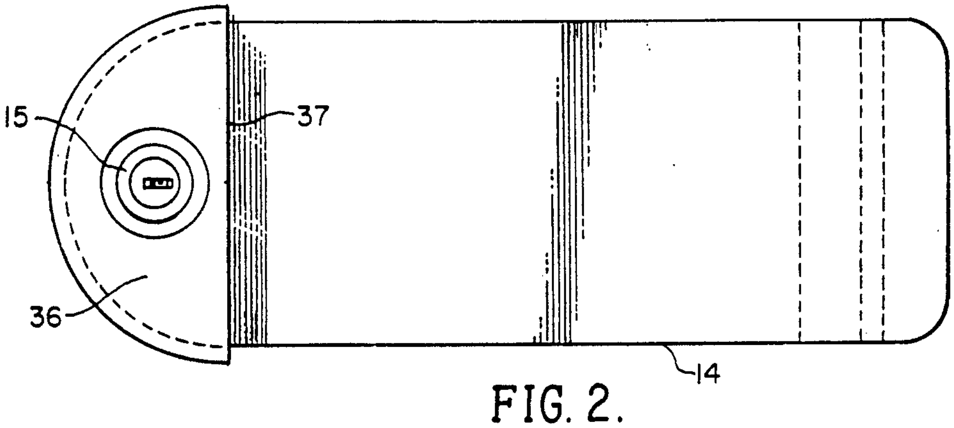
FIG. 2.
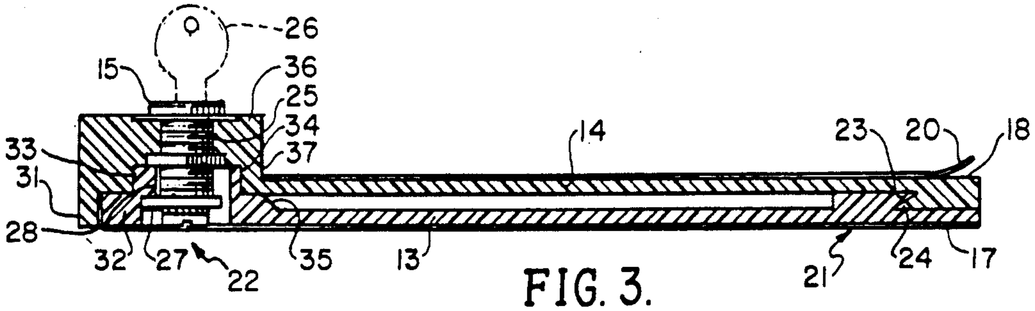
FIG. 3.
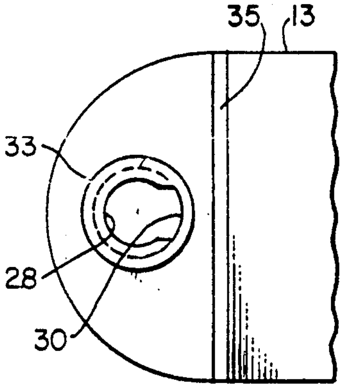
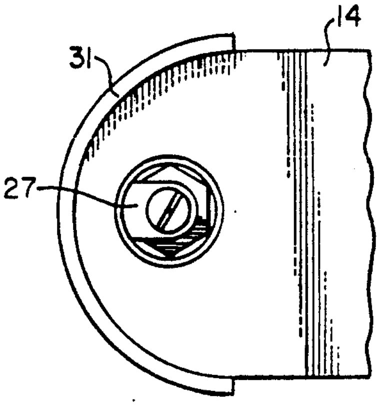
FIG. 4.
FIG. 5.

EQUIPMENT HOLD-DOWN APPARATUS

BACKGROUND OF THE INVENTION

1. Field of the Invention

The present invention relates to a hold-down device for releasably securing office equipment or the like to a stationary support, and more particularly to a novel such device having a hooked engagement between a support and a base as well as a locking latch retainer.

2. Brief Description of the Prior Art

In the past, it has been the conventional practice to place office equipment, such as typewriters, adding machines or the like, onto the top of a desk or a table so that personnel may use these devices for their intended purpose. In many instances, it is desirable to secure such equipment to the desk or table so that the equipment is not only stabilized but cannot be removed by unauthorized persons. In achieving such securement, releasable means must be provided for permitting removal of the equipment for repair and maintenance purposes or so that the equipment may be moved from place to place when it is necessary for equipment use in other locations. Such a securement means must not interfere with the performance or use of the equipment as intended and the securement means should be under the control of authorized personnel so that inadvertent misplacement or removal of the equipment is restricted.

Therefore, a long-standing need has existed to provide a securement means for equipment such as office equipment whereby releasable securement to the desk or tabletop is achieved without modifying the equipment being secured, and which will permit interchangeability of equipment if desired.

SUMMARY OF THE INVENTION

Accordingly, the above problems and difficulties are obviated by the present invention which provides a novel hold-down or securement means for releasably retaining equipment, such as office equipment, onto the top of a desk or table. The hold-down device includes an elongated base which releasably receives an elongated support member that is attached to the underside of the equipment intended to be secured. The opposite ends of the support member and the base include a hook retainer on one end and a lock retainer on the opposite end which not only provides retention but permits alignment through index or registration of the respective retainers so that the support member is properly aligned with the base member to effect securement. Also, a feature of the invention resides in the provision of a raised shoulder adjacent to the exposed lock means or retainer serving as a guide and locator for placement of the support member onto the equipment to be secured.

Therefore, it is among the primary objects of the present invention to provide a novel hold-down for equipment such that the equipment may be releasably secured to the top of a desk or table and which includes a locking retainer so that unauthorized personnel cannot effect removal of the equipment.

Another object of the present invention is to provide a novel hold-down for office equipment or the like which includes a pair of retaining means of which one is a lock and the other is a hook means whereby the hold-down device will releasably secure the office equipment to the tabletop or desk.

Another object of the present invention is to provide a novel inexpensive and easy to install hold-down device for office equipment which is self-locating so that the placement of the equipment on a secured base is made convenient and easy.

Still a further object of the present invention is to provide a novel hold-down device for office equipment, which may be attached to the equipment without the necessity for equipment modification, extra parts, skilled labor or special tools.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a front perspective view of office equipment being held on a tabletop by means of the novel hold-down apparatus incorporating the present invention;

FIG. 2 is an enlarged top plan view of the hold-down device used in FIG. 1;

FIG. 3 is a longitudinal cross-sectional view of the hold-down device shown in FIG. 2 as taken in the direction of arrows 3—3 thereof;

FIG. 4 is a fragmentary view of the locking means cut-out receptacle on the base; and FIG. 5 is a fragmentary view of the latch means of the locking means carried on the support member.

DESCRIPTION OF THE PREFERRED EMBODIMENT

Referring now to FIG. 1, a tabletop is indicated by numeral 10 on which an article of office equipment, such as a typewriter 11, is secured in a releasable fashion thereto by means of the novel hold-down apparatus indicated in the general direction of arrow 12. The hold-down device includes a base member 13 and a support member 14. The base member 13 is fixedly secured to the tabletop 10 while the support member 14 is fixedly secured to the underside of the office equipment 11. A lock means 15 releasably retains the support member 14 to the base member 13 whereby the office equipment 11 is releasably held on the tabletop 10. By use of the lock means 15, only authorized personnel will have a key or code for releasing the support member 14 from the base member 13 when it is desired to move the office equipment 11 from place to place. The thickness of the members 13 and 14 is such that the members will occupy a space beneath the office equipment 11 defined by the spacers or standoffs 16 carried on the underside of the equipment engageable in a resting relationship on top of the table 10.

Referring now in detail to FIGS. 2 and 3, it can be seen that the base member 13 includes an under planar surface having a layer of adhesive 17 thereon which is exposed when a paper covering is peeled therefrom. The adhesive then fixedly secures with the tabletop 10 to mount the base member 13 thereon. It can also be seen in FIGS. 2 and 3 that the support member 14 includes a similar flat planar surface on which an adhesive 18 is disposed and is similarly covered by a paper covering 20 which when peeled away, exposes the adhesive for attachment to the underside of the office equipment 11.

FIGS. 2 and 3 further show that the opposite end of the respective members 13 and 14 include retaining means taking the form of a hook retainer in the direction of arrow 21 and a locking latch retainer in the general direction of arrow 22 on the ends of the members opposite to the end carrying the hook means. The hook retainer 21 includes a first hook member 23 in engagement with an opposite hook member 24 carried on the end of support member 14. The respective hook members are shown in engagement and in their coupled and retaining position. The opposite end of the respective members 13 and 14 are releasably secured by the locking retainer 22 which includes a tumbler assembly 25 as in a conventional locking means which is responsive to the turning of a key 26 whereby a latch member 27 is moved into and out of engagement with an undercut shoulder, indicated by numeral 28. As the lock is rotated, the latch 27 rotates from a locked position in which the undercut shoulder 28 is engaged to an open position, as shown in FIG. 4, when the latch 27 is disengaged with the undercut 28.

With regard to FIGS. 4 and 5, the undercut shoulder is identified by numeral 28 and it can be seen that the shoulder is provided with an access opening 30 so that the latch 27 may be placed in registry with the opening and dropped into position so that the latch 27 may be rotated through the undercut. The alignment of the latch 27 with the opening 30 is a means of registering the office equipment 11 and the support member 14 with respect to the base member 13. Usually, the hook members 23 and 24 are placed in position with the latch 27 dropping through the opening 30, and once the key has been turned, the latch will be under the undercut 28 as shown in FIG. 3. It is also to be noted that registration or indexing means is provided in addition to the alignment of the hooks 23 and 24 and alignment of the latch 27 with the opening 30. The additional registering and index means, as well as guide means, includes a semicircular ledge 31 which encircles the outside of the extreme end of the base member 13, as identified by numeral 32. Also, end 32 of base member 13 includes an upright portion 33 which fits into an annular recess 34 in the end of support member 14. Thus, the underside of support member 14 rests on the top of a ledge 35 as well as the top of hook member 23, and in addition to the engagement of the end of support member 14 on top of the raised portion 33.

Referring now in detail to FIGS. 1–3 inclusive, the end of support member 14 includes the raised portion 36 which extends above the adhesive surface 18 of the member. By being so raised, a flat shoulder 37 is provided against which the back of the office equipment 11 may be in abutment. This serves as a guide and a locator for the equipment while the equipment is being placed onto the support member 14 in adhesive relationship.

Therefore, it can be seen from the foregoing that the hold-down of the present invention provides a novel means for releasably supporting office equipment on the top of a desk or table. Registration or index means is provided so that the support member and the base member can be cooperatively disposed with respect to one another so that the retaining means taking the form of the hooks at one end and the latch lock at the other end can be easily and properly engaged.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A hold-down apparatus comprising:

an article of office equipment;

a support member attached to the underside of said office equipment;

a flat furniture top;

a base member attached to said furniture top;

retention means releasably interlocking respective opposite ends of said support member and said base member together;

said support member and said base member having adhesive surfaces engageable with said office equipment and said base member respectively;

said retention means includes a hook arrangement releasably coupling one pair of adjacent ends of said support member and said base member; a locking arrangement releasably coupling adjacent ends of a second pair of ends of said member and said base member opposite to said one pair;

said hook arrangement including each of said adjacent ends of said one pair terminating with a hook so as to interlock with a hook on the opposite one of said members, said hooks laterally slidable with respect to each other to effect engagement and disengagement;

said locking arrangement including a raised annular portion with an opening on a selected end of said second pair carried on said base member facing the other end of said second pair, said opening having a notch in said raised annular portion in communication with opposite ends of a circular undercut;

said locking arrangement further including a movable latch having an outwardly extending lug, said latch downwardly depending from said end of said support member of said second pair and said lug insertable into said base member portion opening responsive to alignment and registration of said lug with said opening notch whereby lateral rotation of said latch places said lug beneath said undercut to retain said second pair of ends together;

said end of said support member second pair having a circular aperture for insertably receiving said base member raised portion when said latch lug and said portion opening notch are registered and in alignment; and said hooks and said latch lug in engagement with said raised portion notch constituting a releasable retention of said base member and said support member together.

* * * * *